US007637173B2

(12) United States Patent
Hsieh et al.

(10) Patent No.: US 7,637,173 B2

(45) Date of Patent: Dec. 29, 2009

(54) AIRFLOW DETECTION APPARATUS

(75) Inventors: Ming-Chih Hsieh, Tu-Cheng (TW); Tsung-Hsi Li, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 108 days.

(21) Appl. No.: 12/046,460

(22) Filed: Mar. 12, 2008

(65) Prior Publication Data

US 2009/0173164 A1 Jul. 9, 2009

(30) Foreign Application Priority Data

Jan. 4, 2008 (TW) .............................. 97100368 A
Jan. 9, 2008 (CN) ........................ 2008 1 0300050

(51) Int. Cl.
*G01F 15/00* (2006.01)

(52) U.S. Cl. .................................................. 73/861.77

(58) Field of Classification Search .............. 73/861.77, 73/861.74, 861.75, 861.94; 340/870.37
See application file for complete search history.

(56) References Cited

U.S. PATENT DOCUMENTS 5,392,657 A * 2/1995 Feller ...................... 73/861.77
6,945,125 B2 * 9/2005 Vanderah et al. ......... 73/861.77
7,007,557 B1 * 3/2006 Richard ................... 73/861.74

* cited by examiner

*Primary Examiner*—Jewel Thompson
(74) *Attorney, Agent, or Firm*—Frank R. Niranjan

(57) ABSTRACT

An airflow detection apparatus includes an enclosure defining a through hole therein, a conductive pole received in the through hole of the enclosure, a first conductive board electrically connected to a first end of the conductive pole and an electrode of a power source, and a second conductive board electrically connected to the other electrode of the power source. The first and second conductive boards are respectively attached to a top end and a bottom plate of the enclosure. The second conductive board defines a through hole therein to make an end of the conductive pole to pass therethrough, and a diameter of the through hole of the second conductive board is greater than that of the conductive pole. When the conductive pole is driven by an airflow, it will swing to contact with a side bounding the through hole of the second conductive board.

13 Claims, 5 Drawing Sheets

AIRFLOW DETECTION APPARATUS

BACKGROUND

1. Field of the Invention

The present invention relates to detection apparatuses, and particularly to an airflow detection apparatus.

2. Description of Related Art

Airflow detection apparatuses are essential in many applications. High power-density electronics are liable to overheat and damaged should a failure of cooling-fans occur unnoticed. Therefore, it becomes necessary to use some reliable means for airflow detection.

Usually, either a mechanical pressure-actuated vane switch or one of the various types of heat-transfer-based airflow sensors is employed. The mechanical pressure-actuated vane switches are inexpensive, but have low sensitivity. The heat-transfer-based airflow sensors have high sensitivity, but are expensive.

What is needed, therefore, is to provide an airflow detection apparatus which is inexpensive.

SUMMARY

An exemplary airflow detection apparatus includes an enclosure defining a through hole therein, a conductive pole received in the through hole of the enclosure, and a first conductive board and a second conductive board respectively attached to a top end and a bottom plate of the enclosure. The second conductive board defines a through hole, and a size of the through hole of the second conductive board is greater than that of the pole. An end of the pole is directly connected to the first conductive board. An opposite end of the pole is passed through the through hole of the second conductive board, and then connected to a swing board. The first conductive board is electrically connected to an electrode of a power source, and the second conductive board is electrically connected to the other electrode of the power source, thereby an indicating circuit is formed. When the swing board is driven to swing by an airflow to contact with a side bounding the through hole of the second conductive board, the indicating circuit will work.

Other advantages and novel features will become more apparent from the following detailed description when taken in conjunction with the accompanying drawings, in which:

DETAILED DESCRIPTION

Figure 1:
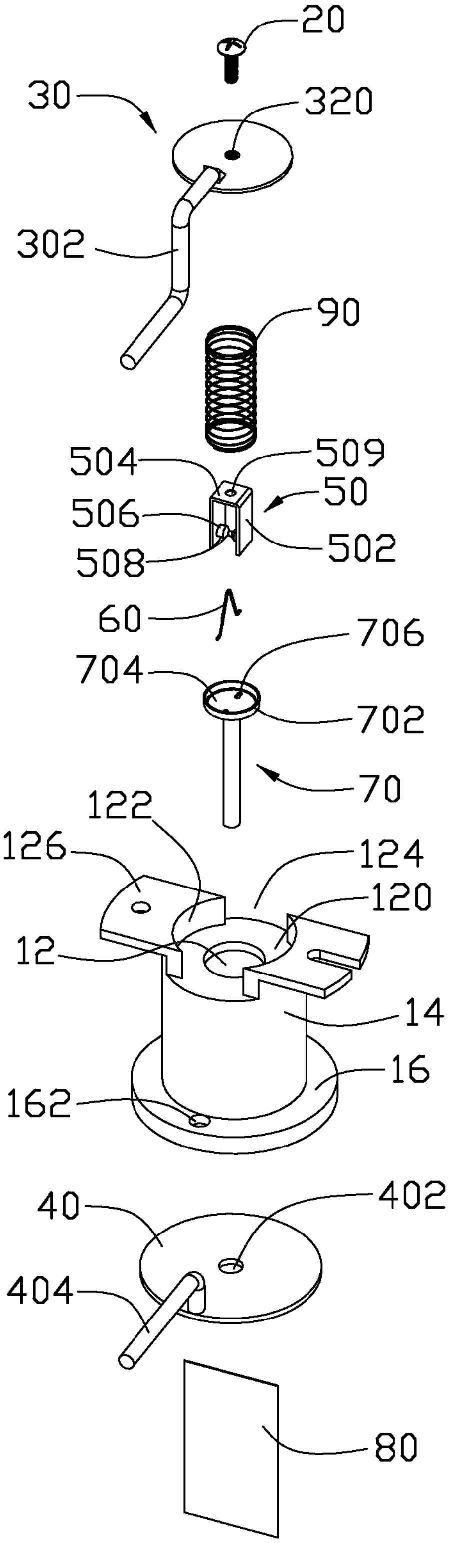
FIG. 1 is an exploded, isometric view of an airflow detection apparatus in accordance with an embodiment of the present invention.
Figure 2:
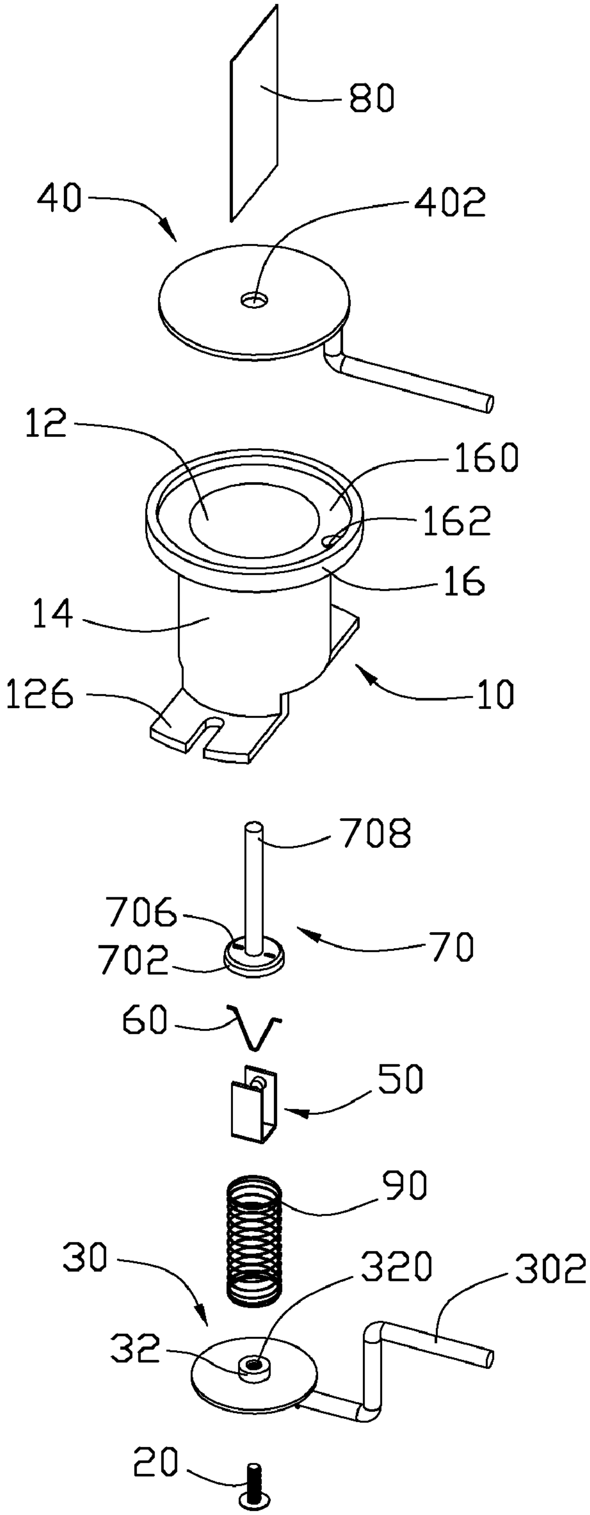
FIG. 2 is similar to FIG. 1, but an inverted view.

Referring to FIG. 1 and FIG. 2, an airflow detection apparatus in accordance with an embodiment of the present invention includes an insulative enclosure 10 defining a through hole 12 therein, an adjusting screw 20, a first conductive board 30, a second conductive board 40, a connecting member 50, a hook 60, a conductive pole 70 received in the through hole 12 of the enclosure 10, a swing board 80, and an elastic member, such as a spring 90.

The enclosure 10 includes a cylinder-shaped main body 14, and a bottom plate 16 extending from a circumference of a bottom of the main body 14. The bottom plate 16 defines a depressed portion 160 in a bottom thereof, communicating with the through hole 12 of the enclosure 10. The depressed portion 160 defines a hole 162 neighboring the edge of the bottom plate 16. Two arc-shaped protrusions 122 symmetrically extend upwards from a top 120 of the main body 14. Two tabs 126 respectively perpendicularly extend out from distal ends of the protrusions 122. Between the protrusions 122, two openings 124 are formed.

The first conductive board 30 is circular. A projecting part 32 extends from a center of a bottom of the first conductive board 30. The first conductive board 30 defines a threaded hole 320 in a center thereof.

The second conductive board 40 is circular and defines a through hole 402 in a central portion thereof.

The connecting member 50 is generally n-shaped and includes two opposite arms portion 502, and a top plate 504 connecting tops of the arms portion 502. The top plate 504 defines a screw hole 509 therein. A hanging post 506 parallel to the top plate 504 connects lower parts of interior sides of the arms portion 502. A slot 508 is defined in a circumference of a middle of the hanging post 506.

The hook 60 has a generally inverted V shape.

The conductive pole 70 has a discoid-shaped cap 702 at a top thereof. The cap 702 defines a depressed portion 704. Two holes 706 are defined in a bottom of the depressed portion 704.

Figure 3:
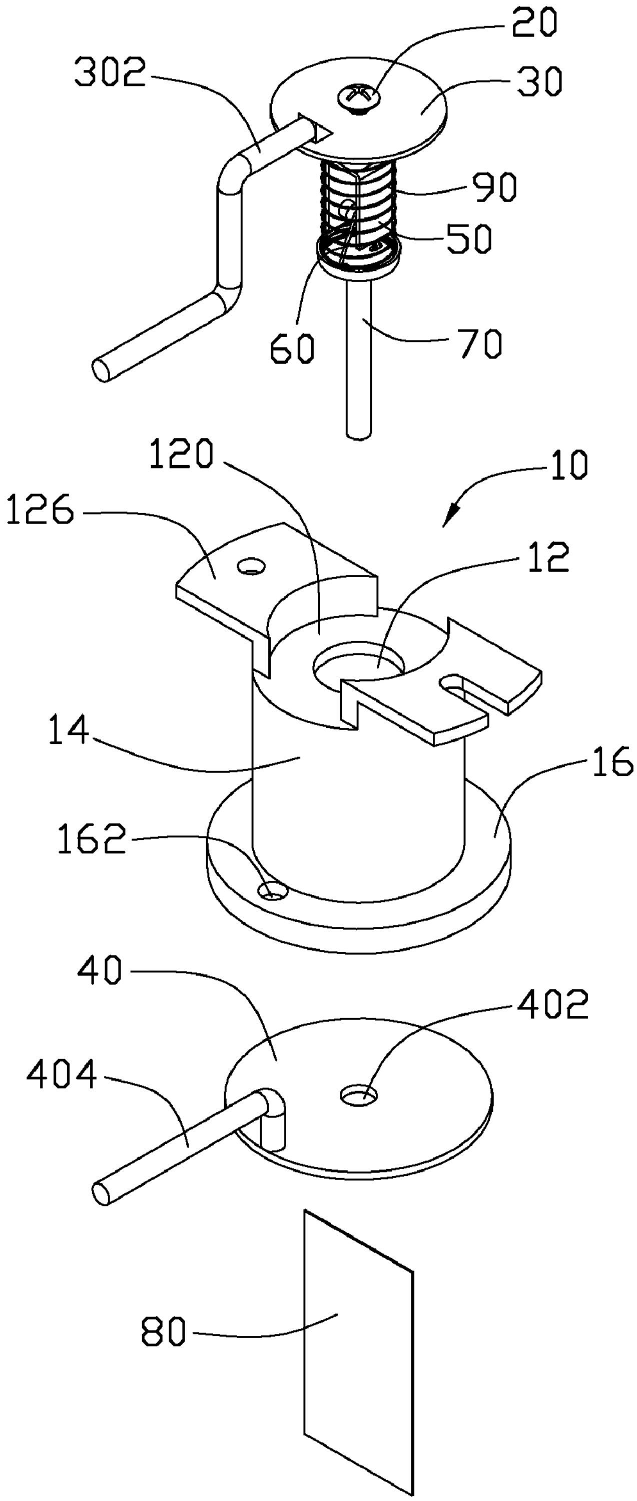
FIG. 3 is a partially assembled view of FIG. 1.
Figure 4:
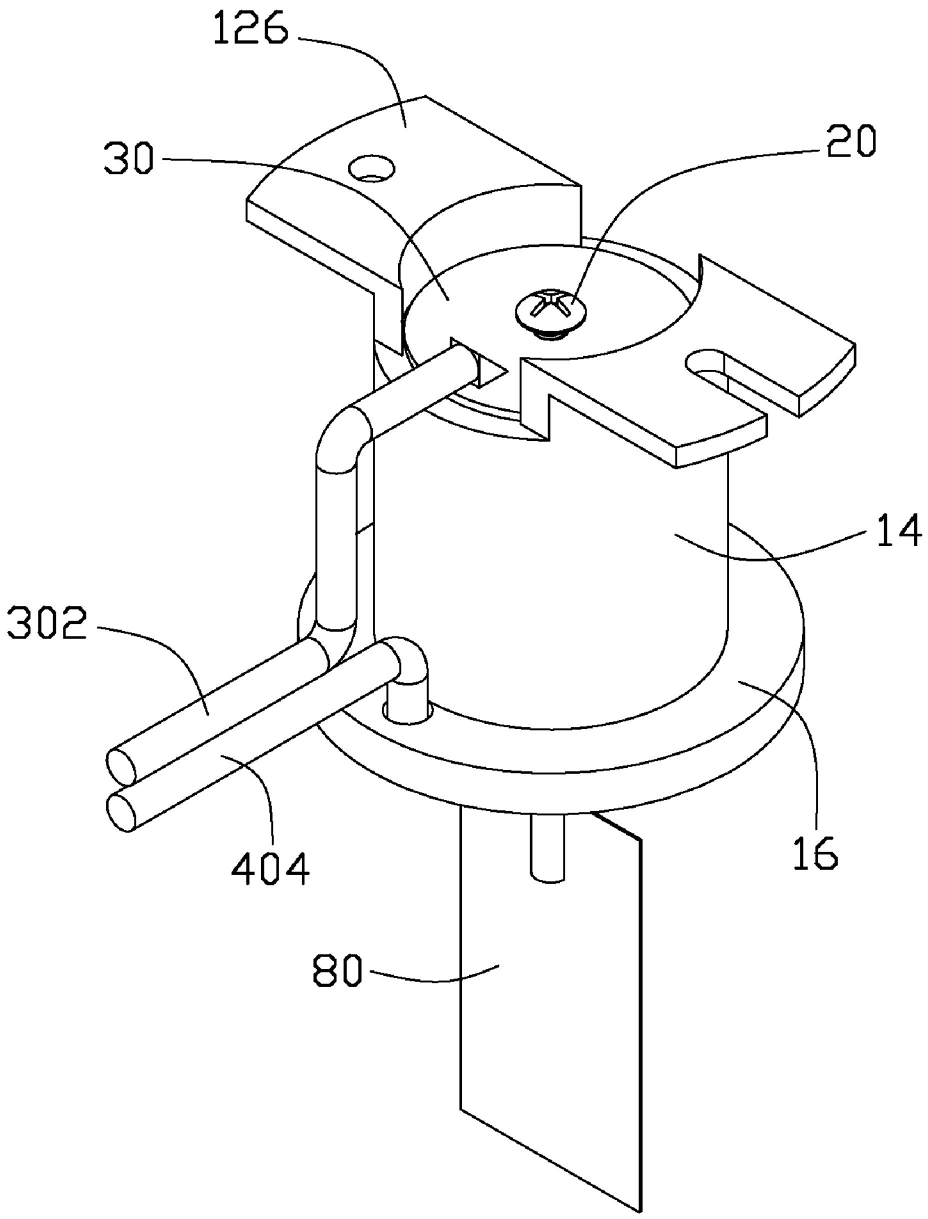
FIG. 4 is an assembled view of FIG. 1.
Figure 5:
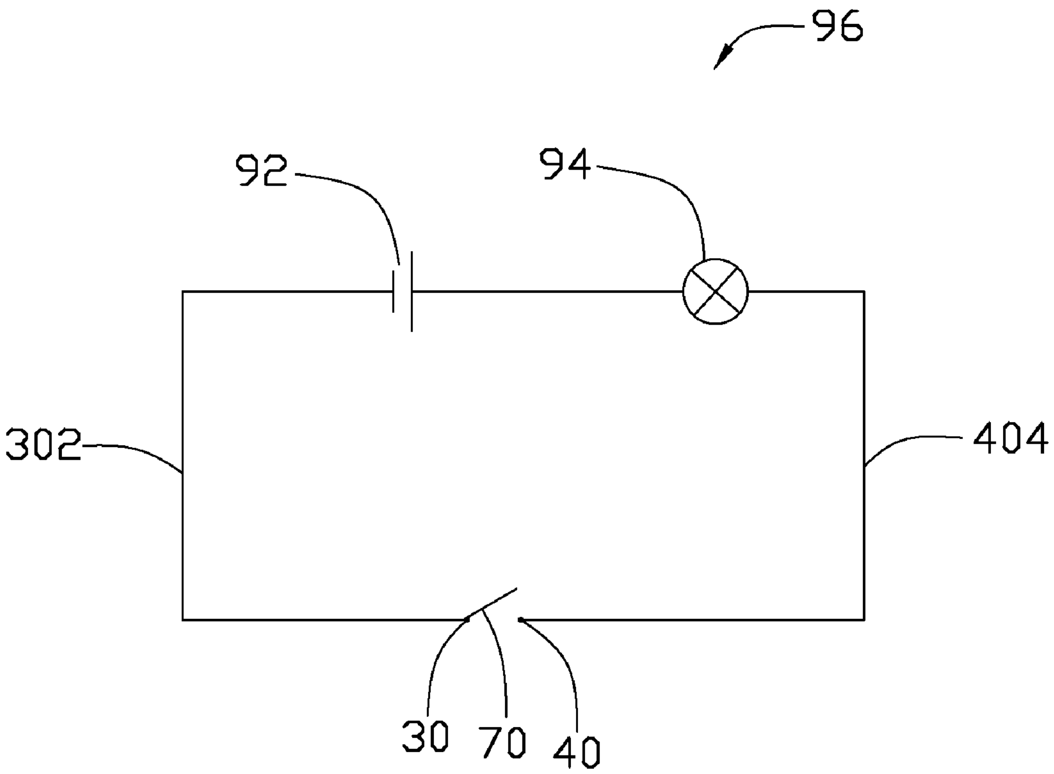
FIG. 5 is a circuit diagram of FIG. 4, together with an indicator and a power supply.

Referring also to FIG. 3 to FIG. 5, in assembly, the hook 60 is engaged in the slot 508 of the hanging post 506 of the connecting member 50, with free ends thereof being engaged in the corresponding holes 706 of the conductive pole 70. Thus, the conductive pole 70 is connected to the connecting member 50. The spring 90 fits about the connecting member 50, with one end thereof being engaged in the depressed portion 704 of the cap 702 of the conductive pole 70. The first conductive board 30 is attached to the top plate 504 of the connecting member 50. The adjusting screw 20 is passed through the threaded hole 320 of the first board 30, and screwed into the screw hole 509 of the top plate 504 of the connecting member 50, to fix the first conductive board 30 to the connecting member 50. The other end of the spring 90 is engaged with the first conductive board 30. The combined assembly of the first conductive board 30, the connecting member 50, the hook 60, the conductive pole 70, and the spring 90 is inserted into the through hole 12 of the enclosure 10. The first conductive board 30 is located on the top 120 of the main body 14, and secured between the protrusions 122 of the enclosure 10. A wire 302 electrically connected to and extending from the first conductive board 30 is passed through one opening 124 of the main body 14 of the enclosure 14, to be electrically connected to an electrode of a power supply 92. A free end opposite to the cap 702 of the conductive pole 70 is passed through the through hole 402 of the second conductive board 40, to be fixed to the swing board 80. A wire 404 electrically connected to and extending from the second conductive board 40 is passed through the other opening 124 of the main body 14 of the enclosure 14, to be electrically connected to the other electrode of the power supply 92. The second conductive board 40 is secured to the depressed portion 160 of the bottom plate 16 of the enclosure 10. An indicator 94 is electrically connected between the first conductive board 30 and a corresponding electrode of the power supply 92, or between the second conductive board 40 and a corresponding electrode of the power supply 92, to form an indicating circuit 96.

If there is no airflow, the swing board 80 will not swing and the conductive pole 70 will not contact an edge rounding the through hole 402 of the second conductive board 40, that is to say, the conductive pole 70 will not be electrically connected to the second conductive board 40. Thus, the indicator 94 will not light. When there is airflow, the swing board 80 is swung to drive the conductive pole 70 to electrically contact the second conductive board 40. Thus, the indicator 94 will light.

In this embodiment, the airflow detection apparatus can be adjusted to ensure a speed of the airflow. The adjusting screw 20 is screwed further into the threaded hole 320 of the first conductive board 30 to move the first conductive board 30 toward the connecting member 50. Thereby a distance between the first conductive board 30 and the cap 702 of the conductive pole 70 becomes less, and then the spring 90 is further distorted. At this time, only if a speed of the airflow is great enough, the swing board 80 can swing to drive the conductive pole 70 to contact the edge of the through hole 402 of the second conductive board 40.

In other embodiments, the conductive pole 70 can be a pole and the cap 702 omitted. The swing board 80 then extends from one end of the conductive pole 70, and the opposite end of the conductive pole 70 is directly fixed to the first conductive board 30.

It is believed that the present embodiments and theirs advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. An airflow detection apparatus comprising:

an enclosure defining a through hole therein;

a conductive pole received in the through hole of the enclosure;

a first conductive board and a second conductive board respectively secured to a top end and a bottom end of the enclosure, the first conductive board electrically connected to a first end of the conductive pole and an electrode of a power, the second conductive board defining a through hole therein to make a second end opposite to the first end of the conductive pole pass therethrough, and a diameter of the through hole of the second conductive board being greater than that of the conductive pole, the second conductive board electrically connected to the other electrode of the power; and a swing member connected to the second end of the conductive pole, capable of swing driven by an airflow to contact a side round the through hole of the second conductive board.

2. The airflow detection apparatus as claimed in claim 1, wherein the enclosure is an insulative hollow cylinder comprising a main body, two arc-shaped protrusions symmetrically extend upwards from a top of the main body to accommodate the first conductive board therebetween.

3. The airflow detection apparatus as claimed in claim 2, wherein a bottom plate extends from a circumference of a bottom of the main body, a depressed portion is defined in a bottom of the bottom plate for securing the second conductive board therein.

4. The airflow detection apparatus as claimed in claim 1, wherein an indicator is electrically connected between the first conductive board and a corresponding electrode of the power, or between the second conductive board and a corresponding electrode of the power.

5. An airflow detection apparatus comprising:

an enclosure defining a through hole therein;

a connecting member;

a conductive pole received in the through hole of the enclosure;

a first conductive board and a second conductive board respectively secured to a top end and a bottom end of the enclosure, the first conductive board electrically connected to the connecting member and an electrode of a power, a first end of the conductive pole electrically hanged to the connecting member, the second conductive board defining a through hole therein to make a second end opposite to the first end of the conductive pole pass therethrough, and a diameter of the through hole of the second conductive board being greater than that of the conductive pole, the second conductive board electrically connected to the other electrode of the power; and a swing member connected to the second end of the conductive pole, capable of swing driven by an airflow to contact a side round the through hole of the second conductive board.

6. The airflow detection apparatus as claimed in claim 5, wherein the connecting member comprises a top plate defining a screw hole therein, the first conductive board defines a threaded hole therein, an adjusting screw is screwed to the threaded hole of the first board, and the screw hole of the top plate, and then the first conductive board is fixed to the connecting member.

7. The airflow detection apparatus as claimed in claim 6, wherein the connecting member further comprises two opposite arm portions perpendicularly extending down from opposite ends of the top plate, a hanging post connects low parts of interior sides of the arm portions, a discoid-shaped cap defining a depressed portion is formed on the first end of the conductive pole, the cap defines two holes therein, a hook is engaged in the hanging post of the connecting member, with free ends thereof being engaged in the corresponding holes of the conductive pole, for hanging the conductive pole to the connecting member.

8. The airflow detection apparatus as claimed in claim 5, further comprising an elastic member, wherein the elastic member is connected the first conductive board and the conductive pole.

9. The airflow detection apparatus as claimed in claim 5, wherein a bottom plate extends from a circumference of a bottom of the main body, a depressed portion is defined in a bottom of the bottom plate for securing the second conductive board therein.

10. An airflow detection apparatus, comprising:

a conductive pole electrically connected to one electrode of a power;

a first conductive member electrically connected to the other electrode of the power, the first conductive member defining a through hole therein, the through hole having a larger size than that of the conductive pole, to make a first end of the conductive pole pass therethrough;

a swing member connected to the first end of the conductive pole, the swing member capable of swing driven by an airflow to contact a side round the through hole of the first conductive member; and an indicator electrically connected between the conductive pole and a corresponding electrode of the power, or between the first conductive member and a corresponding electrode of the power;

wherein when the swing member is driven by an airflow to swing and contact the side round the through hole of the first conductive member, the indicator will light, otherwise the indicator will not light.

11. The airflow detection apparatus as described in claim 10, further comprising a connecting member, a spring, and a second conductive member, wherein a second end opposite to the first end of the conductive pole is electrically connected to the connecting member by a hook, the connecting member is received in the spring, two opposite ends of the spring are respectively connected to the second conductive member and the second end of conductive pole.

12. The airflow detection apparatus as described in claim 11, wherein the connecting member comprises two parallel opposite arm portions, a hanging post connects low parts of interior sides of the arm portions, a cap portion formed one the second end of the conductive pole defining two holes therein, the hook is engaged with the hanging post of the connecting member, with free ends thereof being engaged in the corresponding holes of the conductive pole for hanging the conductive pole to the connecting member.

13. The airflow detection apparatus as described in claim 12, wherein the hook has a generally inverted shape.

* * * * *